United States Patent
Panchal

(10) Patent No.: US 11,856,458 B2
(45) Date of Patent: *Dec. 26, 2023

(54) 5G ZERO TOUCH TRAFFIC MANAGEMENT

(71) Applicant: DISH Wireless L.L.C., Englewood, CO (US)

(72) Inventor: Pareshkumar Panchal, Highlands Ranch, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,513

(22) Filed: Feb. 10, 2023

(65) Prior Publication Data

US 2023/0199564 A1 Jun. 22, 2023

Related U.S. Application Data

(63) Continuation of application No. 17/885,332, filed on Aug. 10, 2022, now Pat. No. 11,622,299, which is a
(Continued)

(51) Int. Cl.
*H04W 52/14* (2009.01)
*H04W 28/08* (2023.01)
(Continued)

(52) U.S. Cl.
CPC .......... *H04W 28/0958* (2020.05); *H01Q 3/26* (2013.01); *H04W 52/143* (2013.01); *H04W 52/243* (2013.01)

(58) Field of Classification Search
None
See application file for complete search history.

(56) References Cited

U.S. PATENT DOCUMENTS

| 8,301,156 B2 | 10/2012 | del Rio-Romero et al. |
| 9,113,353 B1 | 8/2015 | Cotanis et al. |
(Continued)

FOREIGN PATENT DOCUMENTS

WO 2019/236865 A1 12/2019

OTHER PUBLICATIONS

Fan et al., "Self-optimization of coverage and capacity based on a fuzzy neural network with cooperative reinforcement learning," Eurasip Journal on Wireless Communications and Networking, Dec. 1, 2014, 14 pages.
(Continued)

*Primary Examiner* — Kodzovi Acolatse
(74) *Attorney, Agent, or Firm* — Seed IP Law Group LLP

(57) ABSTRACT

Embodiments are directed towards providing 5G zero touch traffic management of cells in a network. A target cell associated with a network objective is identified. One or more neighbor cells are also identified. Transmit power and tilt capabilities of the target cell are determined. An interference between the target cell and the one or more neighbor cells is also determined. An electrical antenna tilt adjustment or a transmit power adjustment is determined for the target cell to apply based on the transmit power capabilities, the tilt capabilities, the interference, and the network objective. The determined electrical antenna tilt adjustment or the determined transmit power adjustment are then provided to the target cell. If the network objective is met after the target cell applies the electrical antenna tilt adjustment or the determined transmit power adjustment, then the changes are confirmed, otherwise they are reversed.

20 Claims, 10 Drawing Sheets

Related U.S. Application Data continuation of application No. 17/124,178, filed on Dec. 16, 2020, now Pat. No. 11,463,912.

(51) Int. Cl.
*H01Q 3/26* (2006.01)
*H04W 52/24* (2009.01)

(56) References Cited

U.S. PATENT DOCUMENTS

| | | |
|---|---|---|
| 9,603,047 B2 | 3/2017 | Sridhar et al. |
| 9,832,652 B1 | 11/2017 | Singh et al. |
| 2009/0298515 A1 | 12/2009 | Czaja et al. |
| 2012/0270593 A1 | 10/2012 | Park et al. |
| 2014/0197985 A1 | 7/2014 | Jensen et al. |
| 2014/0266908 A1 | 9/2014 | Pandey |
| 2015/0011227 A1 | 1/2015 | Wellington |
| 2015/0126173 A1 | 5/2015 | Dribinski et al. |
| 2015/0141027 A1 | 5/2015 | Tsui et al. |
| 2018/0352069 A1 | 12/2018 | Hirabayashi et al. |
| 2019/0072386 A1 | 3/2019 | Howell et al. |
| 2019/0208438 A1 | 7/2019 | Yang et al. |
| 2020/0163026 A1* | 5/2020 | Zhao .................. H04W 52/242 |
| 2020/0314683 A1 | 10/2020 | Imran et al. |
| 2021/0360474 A1 | 11/2021 | Chen et al. |
| 2023/0199564 A1* | 6/2023 | Panchal .............. H04W 52/143 370/328 |

OTHER PUBLICATIONS

International Search Report and Written Opinion for PCT Application No. PCT/US2021/063140, dated Apr. 7, 2022, 16 pages.
Scully et al., "INFSO-ICT-216284 Socrates—D2.1—Use Cases for Self-Organizing Networks," Mar. 31, 2008, pp. 1-71.

* cited by examiner

| | Network objective for target cell | Down Tilt | Reduce transmit power of target cell | Reduce transmit power of neighboring cells | Up Tilt | Increase transmit power of target cell | Increase transmit power of neighboring cells |
|---|---|---|---|---|---|---|---|
| 602 | Reduce load on highly loaded target cell | X | X | | | | X |
| 603 | Increase load on lightly loaded target cell | | | | X | X | |
| 604 | Improve target cell utilization based on users movements | X | | | X | X | X |
| 605 | Improve target cell uplink network quality | X | X | | | | |
| 606 | Improve interference to target loaded cells | X | X | X | | | |
| 607 | Improve target cell utilization if priority requirement | X | X | | X | X | |
| 608 | Target cell not priority requirement | X | X | | | | |
| 609 | Adjust target cell utilization based on new turned-up cells | X | X | | | | |
| 610 | Improve highly loaded target cell to maintain service quality | X | X | | | | |

| Network objective for target cell | Down Tilt | Reduce transmit power of target cell | Reduce transmit power of neighboring cells | Up Tilt | Increase transmit power of target cell | Increase transmit power of neighboring cells |
|---|---|---|---|---|---|---|
| 611 — Improve target cell utilization based on time of user movements | X | X | | X | X | X |
| 612 — Improve target cell utilization based on seasonal users movements | X | X | X | X | X | X |
| 613 — Improve target cell utilization based on users speed and requirements | X | X | | X | X | |
| 614 — Improve target cell utilization based on interference user experience | X | X | X | | | |
| 615 — Improve target cell utilization based on low coverage user experience | | | | X | X | X |
| 616 — Improve target cell utilization based on neighbor cell service interruption | | | | X | X | |

FIG. 6B

5G ZERO TOUCH TRAFFIC MANAGEMENT

TECHNICAL FIELD

The present disclosure relates generally to digital message communications and, more particularly, to utilizing zero touch traffic management of cells within a 5G communications network.

BACKGROUND

Description of the Related Art

Smart phones are being used more and more by more and more people. As the use of smart phones has increased, so too has the desire for more reliable, fast, and continuous transmission of content. In an effort to improve the content transmission, networks continue to improve with faster speeds and increased bandwidth. The advent and implementation of 5G technology has resulted in faster speeds and increased bandwidth, but with the drawback of needing more cells in the network to limit dead spaces. Adding additional cells in a smaller geographical area can results in cell interference, some cells becoming over loaded, or some cells being under-utilized. It is with respect to these and other considerations that the embodiments described herein have been made.

BRIEF SUMMARY

Briefly described, embodiments are directed toward systems and methods of providing 5G zero touch traffic management of cells in a network. A cell utilization server determines if a target cell in the network should apply an electrical antenna tilt adjustment or a transmit power adjustment based on a network objective (e.g., reduce a load on the target cell, reduce interference between the target cell and a neighbor cell, etc.) and the current operating parameters of the target cell. If so, the cell utilization server instructs the target cell to apply the electrical antenna tilt adjustment, the transmit power adjustment, or a combination thereof. The cell utilization server then determines if the network objective is met after the target cell applies the electrical antenna tilt adjustment or the determined transmit power adjustment. If the network objective is met, then the changes are confirmed, otherwise they are reversed. This process can be performed for a single target cell, multiple target cells, or a combination of a target cell and one or more neighbor cells. In this way, utilization of the cells in the network can be managed and dynamically changed to accommodate for changes in the network or its traffic.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 6A-6B illustrate a table of example use case scenarios for implementing zero touch traffic management in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
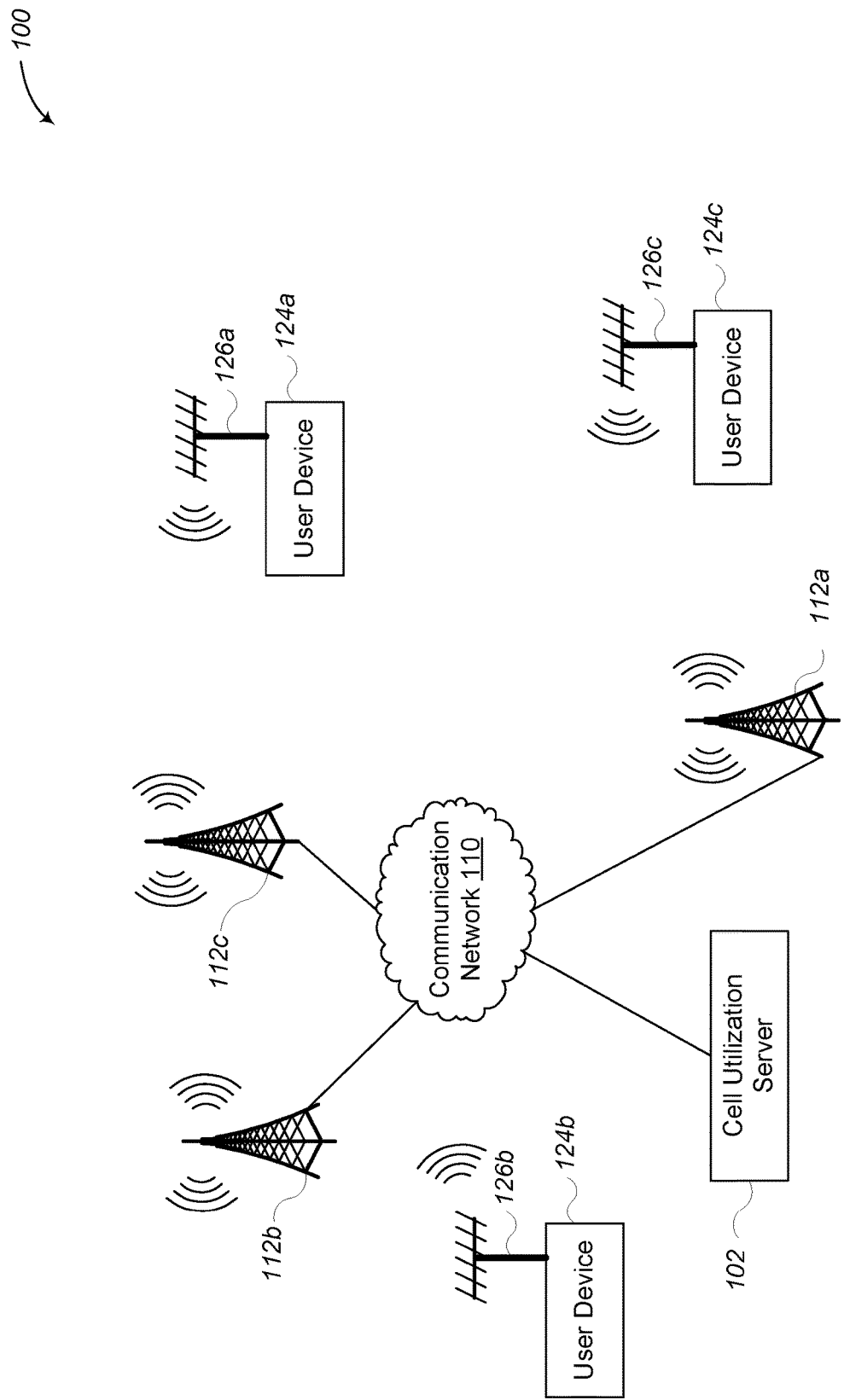
FIG. 1 illustrates a context diagram of an environment for providing zero touch traffic management of cells within a 5G communications network in accordance with embodiments described herein.

FIG. 1 illustrates a context diagram of an environment for providing zero touch traffic management of cells within a 5G communications network in accordance with embodiments described herein. Environment 100 includes a plurality of cells 112a-112c, a plurality of user devices 124a-124b, a cell utilization server 102, and a communication network 110. The cells 112a-112c are cellular towers that together implement a 5G cellular communications network. The cells 112a-112c may include or be in communication with base stations, radio back haul equipment, antennas, or other devices, which are not illustrated for ease of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. The overall capacity of the network created by the cells 112a-112c depends on the coverage of each cell 112 and the interference that the cells 112 may have on each other, which can be measured by spectral efficiency. Although embodiments are directed to 5G cellular communications, embodiments are not so limited and other types of cellular communications technology may also be utilized or implemented. In various embodiments, the cells 112a-112c may communicate with each other via communication network 110. Communication network 110 includes one or more wired or wireless networks, which may include a series of smaller or private connected networks that carry information between the cells 112a-112c.

The user devices 124a-124c are computing devices that receive and transmit cellular communication messages with the cells 112a-112c via antennas 126a-126c, respectively. Examples of user devices 124a-124c may include, but are not limited to, mobile devices, smartphones, tablets, cellular-enabled laptop computers, or other computing devices that can communication with a 5G cellular network.

The cell utilization server 102 monitors the network traffic of the cells 112a-112c to manage traffic by instructing different cells to modify tilt or transmit power parameters to steer traffic to different cells. This traffic management and cell modification enables for zero manual administrative input and can be performed in near real time to adjust for changing traffic conditions.

The cell utilization server 102 can use the monitored network traffic to identify traffic patterns or changes in traffic patterns, quality of service, service interruptions, and other traffic-based metrics based on the load, interference, usage, timing, and other characteristics of the cells and the network traffic handled by each cell. The cell utilization server 102 can then determine if a target cell, such as cell 112b can meet a network objective or to improve overall network capacity or efficiency. The network objective may be to reduce or increase the load on a target cell, provide improved service for high priority users, reduce interference between cells, etc.

The cell utilization server 102 can try to meet a network objective by instructing the target cell to apply an antenna tilt adjustment (e.g., down tilt or up tilt), apply a transmit power adjustment (e.g., increase the transmit power or decrease the transmit power), or some combination thereof. In various embodiments, one or more cells 112 may be employed or instructed to perform an antenna tilt adjustment, a transmit power adjustment, or some combination thereof to meet a network objective. For example, cell 112a may be instructed to perform a down tilt adjustment, whereas cell 112b may be instructed to increase its transmit power. Moreover, cells 112a-112b may be ranked or ordered to determine which adjustments to make. For example, if cell 112a is heavily loaded, cell 112b is lightly loaded, and cell 112c is operating at an efficient capacity, then cells 112a and 112b may be ranked higher than cell 112c as being able to perform an adjustment. As another example, if cell 112a is heavily loaded, but it cannot perform a down tilt adjustment and it is already operating at a minimum transmit power, then it cell 112b may be ranked before cell 112a as being able to perform an adjustment because cell 112c is already operating at an efficient capacity. FIGS. 6A-6B illustrate an example table of the types of adjustments that can be made for different network objectives.

Figure 2:
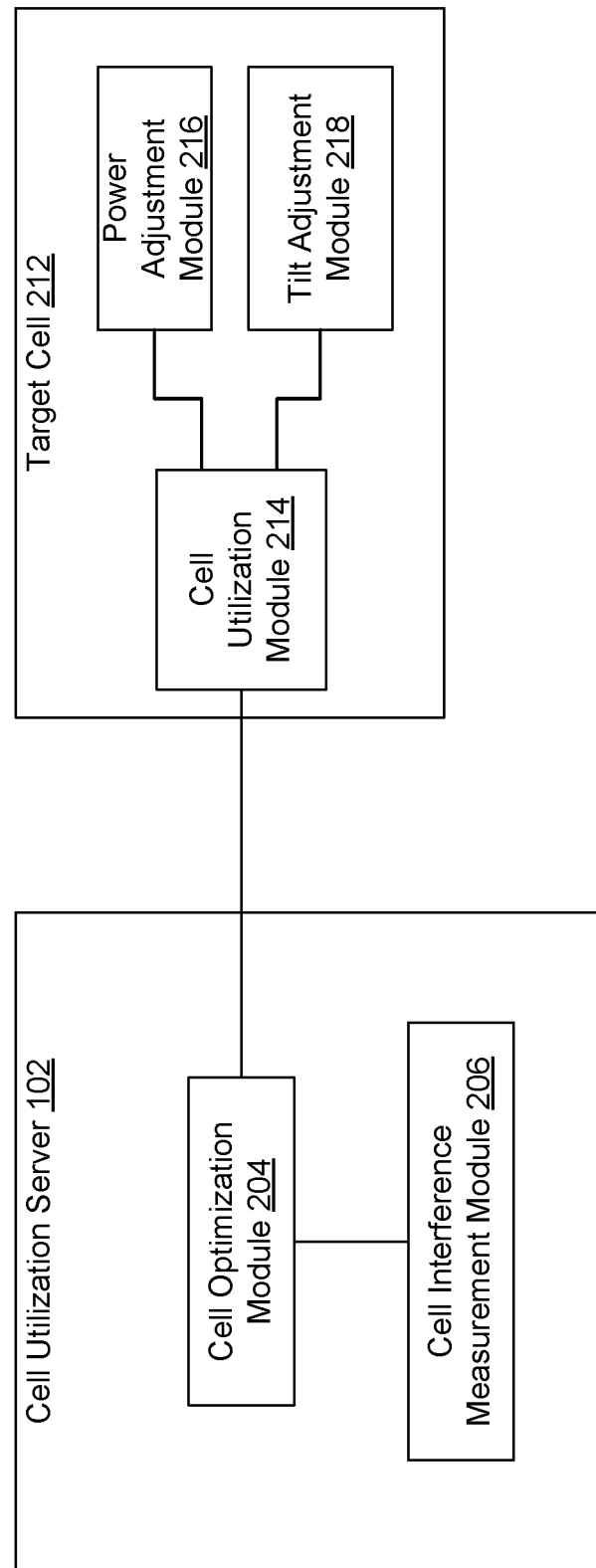
FIG. 2 is a context diagram of a non-limiting embodiment of systems that provide functionality to track and implement zero touch traffic management in accordance with embodiments described herein.

FIG. 2 is a context diagram of a non-limiting embodiment of systems that provide functionality to track and implement zero touch traffic management in accordance with embodiments described herein. Example 200 includes a cell utilization server 102 and a target cell 212. The cell utilization server 102 includes a cell optimization module 204 and a cell interference measurement module 206, and the target cell 212 includes a cell utilization module 214, a power adjustment module 216, and a tilt adjustment module 218. The target cell 212 is an embodiment of a cell 112 in FIG. 1.

The cell optimization module 204 of the cell utilization server 102 monitors the traffic of one or more cells, including the target cell 212. A load, interference, service quality, user feedback, and other information is obtained regarding the traffic on each cell. This information is used to determine if the target cell 212 is experiencing a heavy load or a light load, if there is interference that exceeds a threshold amount between cells, if there are observable movement or timing patterns in the traffic, and other conditions that may affect the efficiency of the target cell 212. In various embodiments, the cell optimization module 204 coordinates with the cell interference measurement module 206 to obtain the interference on target cell 212 by other neighboring cells.

The cell optimization module 204 then determines if the target cell 212 should adjust its antenna tilt or its transmission power. If the target cell 212 is to adjust its antenna tilt or its transmission power, then the cell optimization module 204 sends a message to the cell utilization module 214 of the target cell 212. After the target cell 212 makes the adjustments, the cell optimization module 204 monitors the traffic on the network to see if the adjustments improved the network efficiency or capacity. If so, the changes are maintained; otherwise, the target cell is instructed to reverse the changes and revert to its previous settings.

The cell utilization module 214 of the target cell 212, obtains the message or instructions from the cell utilization server 102. The cell utilization module 214 coordinates the adjustments with the power adjustment module 216, the tilt adjustment module 218, or a combination thereof. For example, if the cell utilization server 102 indicates that the target cell 212 is to adjust its antenna tilt, then the cell utilization module 214 coordinates the tilt adjustment with the tilt adjustment module 218. The tilt adjustment module 218 may perform the calculations and determinations needed to adjust the electrical antenna tilt of the target cell 212 based on the instruction or information received from the cell utilization server 102.

If, for example, the cell utilization server 102 indicates that the target cell 212 is to adjust its transmit power, then the cell utilization module 214 coordinates the power adjustment with the power adjustment module 216. The power adjustment module 216 may perform the calculations and determinations needed to adjust the transmission power utilized by the target cell 212 based on the instruction or information received from the cell utilization server 102. In some embodiments, the cell utilization module 214 may employ embodiments of the cell optimization module 204.

Although the cell utilization module 214, power adjustment module 216, and tilt adjustment module 218 are shown as separate modules, embodiments are not so limited and one or more modules may be employed to perform the functionality of the cell utilization module 214, power adjustment module 216, and tilt adjustment module 218.

The operation of certain aspects will now be described with respect to FIGS. 3, 4A-4B, and 5A-5B. In at least one of various embodiments, processes 300, 400, and 500 described in conjunction with FIGS. 3, 4A-4B, and 5A-5B may be implemented by or executed via circuitry or on one or more computing devices, such as cell utilization server 102 or cell 112 in FIG. 1.

Figure 3:
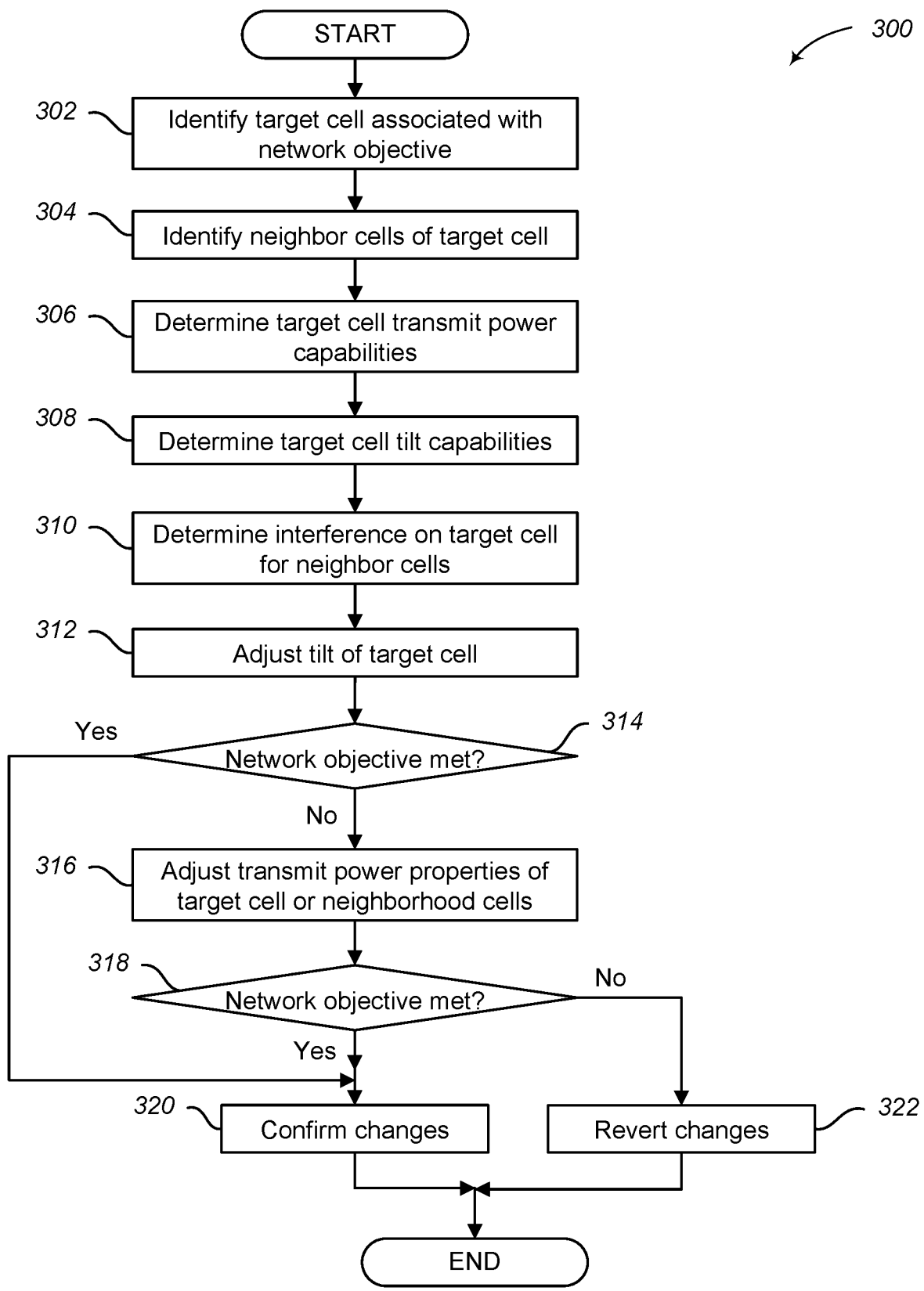
FIG. 3 illustrates a logical flow diagram showing one embodiment of a process for implementing zero touch traffic management of a target cell within a 5G communications network in accordance with embodiments described herein.

FIG. 3 illustrates a logical flow diagram showing one embodiment of a 300 process for implementing zero touch traffic management of a target cell within a 5G communications network in accordance with embodiments described herein.

Process 300 begins, after a start block, at block 302, where a target cell associated with a network objective is identified. The network objective may be to reduce a load on the target cell, increase a load on the target cell, reduce interference on or by the target cell, improve the target cell's utilization during different times or seasons or for different user priority requirement, etc. FIGS. 6A-6B illustrate a table of use case examples of different network objectives for a target cell.

In some embodiments, the target cell may be a highly loaded cell (e.g., the current or average load on the target cell is above a threshold amount) or an under-utilized or lightly loaded cell (e.g., the current or average load on the target cell is below a threshold amount). In various embodiments, the load on the target cell may be categorized as a low load (e.g., a cell with carried traffic less than 50% of the offered or available traffic), a medium load (e.g., a cell with carried traffic greater than 50% and less than 80% of offered or available traffic), or a high load (e.g., a cell with carried traffic greater than 80% of offered or available traffic).

In other embodiments, the target cell may be a cell having a poor uplink or downlink quality. For example, the target cell may be categorized as a poor uplink cell if the uplink quality of the target cell is less than 25%. As another example, the target cell may be categorized as a poor downlink cell if the downlink quality is less than 25%. In yet another embodiment, the target cell may be categorized as a poor uplink/downlink cell if the uplink quality is less than 25% and the downlink quality is less than 25%.

In yet other embodiments, the target cell may be a cell associated with specific group of users movements (e.g., based on season, time of day, number of users traveling a high speeds, etc.), a cell experiencing interference above a threshold amount with other cells, a cell associated with users having a priority requirement, a newly tuned-up cell or a cell near a newly tuned-up cell, a cell associated with users who have expressed poor or interrupted service, etc.

In various embodiments, the radio coverage area or cell radius of the target cell may also be determined. The coverage area of the target cell depends on the location of the target cell, the antenna height, transmission power, and other specifics. If the radio coverage area is insufficient in the specific area of the target cell and the target cell is not carrying minimum traffic, there is a need to improve the radio coverage of the target cell by adjusting the tilt or transmission power, or both of the target cell. In some embodiments, the target cell may be identified as not carrying minimum traffic if the target cell coverage radius is less than a minimum cell coverage radius, if the target cell's carried traffic is less than a minimum cell carried traffic, if the target cell is a number of cells with an interference matrix less than two, if the target cell has a number of hand over attempts less than a minimum number of hand over attempts in a given time period (e.g. per day), or some combination thereof.

The following actions or step discussed with reference to FIG. 3 may be different depending on the capacity, capabilities, or utilization of the target cell. For example, whether the target cell is instructed to perform a down tilt, an up tilt, a transmission power increase, or a transmission power decrease depends on the target cell. For example, a highly loaded cell may be down tilted to reduce its coverage area and thus reduce its load, whereas a lightly loaded sell may be up tilted to increase its coverage area and thus increase its load. FIGS. 6A-6B illustrate a table of use case examples of the actions taken depending on the target cell and the network objective.

Process 300 proceeds to block 304, where neighbor cells associated with the target cell are identified. In some embodiments, the neighbor cells may be selected based on their proximity to the target cell. For example, neighbor cells may be separated into multiple layers based on their proximity to the target cell. In at least one embodiment, neighbor cells within a first threshold distance from the target cell may be in a first layer, neighbor cells within a second threshold distance but farther than the first threshold distance from the target cell may be in a second layer, and neighbor cells outside the second threshold distance from the target cell may be in a third layer. In one example embodiment, the neighbors in the first and second layers are identified.

In some embodiments, the neighbor cells may be selected based on the target cell. For example, if the target cell is a highly loaded cell, then the identified neighbor cells may include those neighbor cells within a threshold distance from the target cell and are low or medium loaded (e.g., the current or average load on the neighbor cell is below one or more threshold amounts). Conversely, if the target cell is a lightly loaded cell, then the identified neighbor cells may include those neighbor cells within a threshold distance from the target cell and are highly loaded (e.g., the current or average load on the neighbor cell is above one or more threshold amounts). As another example, if the target cell is experiencing high amounts of interference, then the identified neighbor cells may be those cells being within a distance and having a transmission power high enough to interfere with the target cell.

In some embodiments, the performance or capabilities of the neighbor cells may be determined and used to identify the neighbor cells. For example, the load, uplink or downlink quality, radio coverage area, or other parameters of the neighbor cells may be determined. If a neighbor cell is highly loaded and already operating at minimum tilt and minimum transmission power, than that neighbor cell may be excluded from the identified neighbor cells.

Process 300 continues at block 306, where the transit power capabilities of the target cell are determined. In various embodiments, the transmit power capabilities may include a minimum transmit power, a maximum transmit power, a current transmit power, or some combination thereof.

In some embodiments, the target cell's transmit power capabilities are determined by sending a request to the target cell to obtain the transmit power capabilities of the target cell. In other embodiments, a database or other data structure is queried to obtain the transmit power capabilities of the target cell. Process 300 proceeds next to block 308, where the tilt capabilities of the target cell are determined. In various embodiments, the tilt capabilities may include a minimum tilt, a maximum tilt, a current tilt, or some combination thereof.

In some embodiments, the target cell's tilt capabilities are determined by sending a request to the target cell to obtain the tilt capabilities of the target cell. In other embodiments, a database or other data structure is queried to obtain the tilt capabilities of the target cell. In some embodiments, the tilt capabilities of the target cell are obtained in parallel with the transmit power capabilities of the target cell, such as in a same request or query.

Process 300 continues next at block 310, where an interference on the target cell for the identified neighbor cells is determined. In various embodiments, the interference may be a cell-to-cell interference percentage based on the coverage area or cell radius of the cells. In some embodiments, the interference from a neighbor cell to the target cell, or vice versa, can be determined by using the base station antenna patterns of each cell and identifying an intersected area, Azimuth or orientation, tilt pattern, etc. This intersection area can range from 1 to 100%, where the higher the intersect area percentage indicates a higher interference from that cell. This interference percentage can be used to derive the impacted network quality. The interference percentage may be a weighted consideration based on the interference from cell center area to cell center area, cell center area to cell edge area, cell edge area to cell center area, and cell edge area to cell edge area for each target/neighbor cell pair. The cell center area refers to the near field of the cell transmission, and the cell edge area refers to the far field of the cell transmission. Settings and which interference to consider can be selected based on the network requirements. In various embodiments, a cell interference matrix can be derived for all the cell-to-cell relations in the network.

Process 300 proceeds to block 312, where an antenna tilt of the target cell is adjusted. In various embodiments, the tilt of the target cell is an electrical tilt adjustment by changing parameters or dipole position of the target cell antenna.

The type of tilt adjustment, down tilt or up tilt, and the amount of tilt is selected based on the target cell. For example, if the target cell is a highly loaded cell, then the target cell antenna may be down tilted to reduce the cell radius or coverage area of the target cell. Conversely, if the target cell is a lightly loaded cell, then the target cell antenna may be up tilted to increase the cell radius or coverage area of the target cell. FIGS. 6A-6B illustrate a table of use case examples of the up tilt or down tilt of the target cell depending on the network objective for the target cell.

In some embodiments, the amount of tilt adjustment may be selected based on the tilt capabilities of the target cell, the amount of improved performance or utilization needed to meet the network objective, etc. In other embodiments, the amount of tilt adjustment may be based on the interference matrix between the target cell and the neighbor cells. In yet other embodiments, the amount of tilt adjustment may be determined based on an elevation matrix indicating an elevation or position of the target cell and neighbor cells, which can impact interference. For example, if the target cell has an effective radio height ($ERH_{target}$=Terrain Elevation at Target Cell+Target Cell Antenna Height) that is higher than the effective radio height of a neighbor cell ($ERH_{neighbor}$=Terrain Elevation at Neighbor Cell+Neighbor Cell Antenna Height), then there is a higher probability that the target cell is overshooting and an uptilt of the target cell may create additional interference. Conversely, if the target cell has an effective radio height ($ERH_{target}$) that is lower than the effective radio height of a neighbor cell ($ERH_{neighbor}$), then there is a higher probability that the target cell is undershooting the neighbor cell and a down tilt of the target cell may further reduce the cell coverage area which will result in a reduction of cell traffic.

Process 300 continues at decision block 314, where a determination is made whether the network objective is met for the target cell. In some embodiments, the network, including the target cell performance and the neighbor cell performance, is analyzed to determine if the network objective has been met based on the tilt adjustments. For example, has the target cell's load changed to accomplish the network objective, did the tilt adjustment improve the network service quality provided by the target cell, is the improvement to the target cell consistent (e.g., is the target cell efficiently utilized without being lightly or heavily loaded), does the adjustment improve any network level scalability, etc.

If the network objective is met based on the antenna tilt adjustment of the target cell, then process 300 flows to block 320 to confirm the changes; otherwise, process 300 flows to block 316.

At block 316, the transmit power properties of the target cell or the neighborhood cells are adjusted. For example, if the target cell is a highly loaded cell, then the transmit power of the target cell may be reduced to reduce the cell radius or coverage area of the target cell. Conversely, if the target cell is a lightly loaded cell, then the transmit power of the target cell may be increased to increase the cell radius or coverage area of the target cell. As another example, if the target cell is a highly loaded cell, then the transmit power of one or more neighbor cells may be increased to increase their cell radius or coverage area to absorb some of the load from the target cell. Conversely, if the target cell is a lightly loaded cell, then the transmit power of one or more neighbor cells may be decreased to their decrease the cell radius or coverage area to lessen their load and allow the target cell to absorb additional load. FIGS. 6A-6B illustrate a table of use case examples of the transmit power adjustments of the target cell or neighboring cells depending on the network objective for the target cell.

In some embodiments, the amount of transmit power adjustment may be selected based on the transmit power capabilities of the target cell or neighbor cells, the amount of improved performance or utilization needed to meet the network objective, etc. In other embodiments, the amount of transmit power adjustment may be based on the interference matrix between the target cell and the neighbor cells, similar to determining the tilt adjustment above In yet other embodiments, the amount of transmit power adjustment may be determined based on the elevation matrix of elevation or position of the target cell, similar to determining the tilt adjustment above.

Process 300 proceeds next to decision block 318, where a determination is made whether the network objective is met for the target cell. In various embodiments, decision block 318 may employ embodiments of decision block 314 to determine if the network objective is met. If the network objective is met based on the transmit power adjustments of the target cell or one or more neighbor cells, then process 300 flows to block 320 to confirm the changes; otherwise, process 300 flows to block 322.

At block 320, the changes are confirmed. In various embodiments, the changes may be temporary or permanent. For example, if the adjustments are seasonal or based on a specific time, then the changes are confirmed for that season or time. After block 320, process 300 terminates or otherwise returns to a calling process to perform other actions.

If, at decision block 318, the network objective is not met, then process 300 flows from decision block 318 to block 322. At block 322, the changes are reverted to the previous tilt or transmit power settings. In various embodiments, a history of changes and whether they met the network object may be stored and used for future planning or selection of adjustments when process 300 is performed for a same or similar target cell. After block 322, process 300 terminates or otherwise returns to a calling process to perform other actions.

Although blocks 312 and 316 discuss making adjustments to or by the target cell, embodiments are not so limited. In some embodiments, a tilt of one or more of the neighbor cells may be adjusted in combination with or instead of adjusting the tilt of the target cell. For example, if the target cell is already at a minimum tilt, but a down tilt is selected to reduce the target cell's coverage area (e.g., if the target cell is experiencing interference that exceeds a threshold amount), then a neighbor cell may be instructed to perform a down tilt to reduce interference with the target cell. As another example, if the target cell is highly loaded, then the target cell may be down tilted and a neighbor cell may be up tilted to increase its coverage area to absorb some of the traffic from the target cell.

In other embodiments, a transmit power of one or more of the neighbor cells may be adjusted in combination with or instead of adjusting the transmission power of the target cell. For example, if the target cell is already at a maximum transmission power, but a transmission power increase is selected to increase the target cell's coverage area to handle high priority user requirements (e.g., transmissions to and from those users receive priority over other users), then a neighbor cell may be instructed to increase its transmission power to increase its coverage area to provide additional coverage for the high priority users.

In various embodiments, a combination of tilt adjustment and transmission power adjustments may be made by the target cell, one or more neighbor cells, or some combination thereof. In at least one embodiment, the target cell and one or more neighbor cells may be ranked or ordered to perform one or more adjustments. This ranking or ordering may be based on their performance, characteristics, or capabilities. For example, if the target cell is heavily loaded and a neighbor cell is lightly loaded, but the target cell is already at a maximum down tilt and a minimum transmission power, then the neighbor cell may be ranked higher for adjustments over the target cell.

Figure 4A:
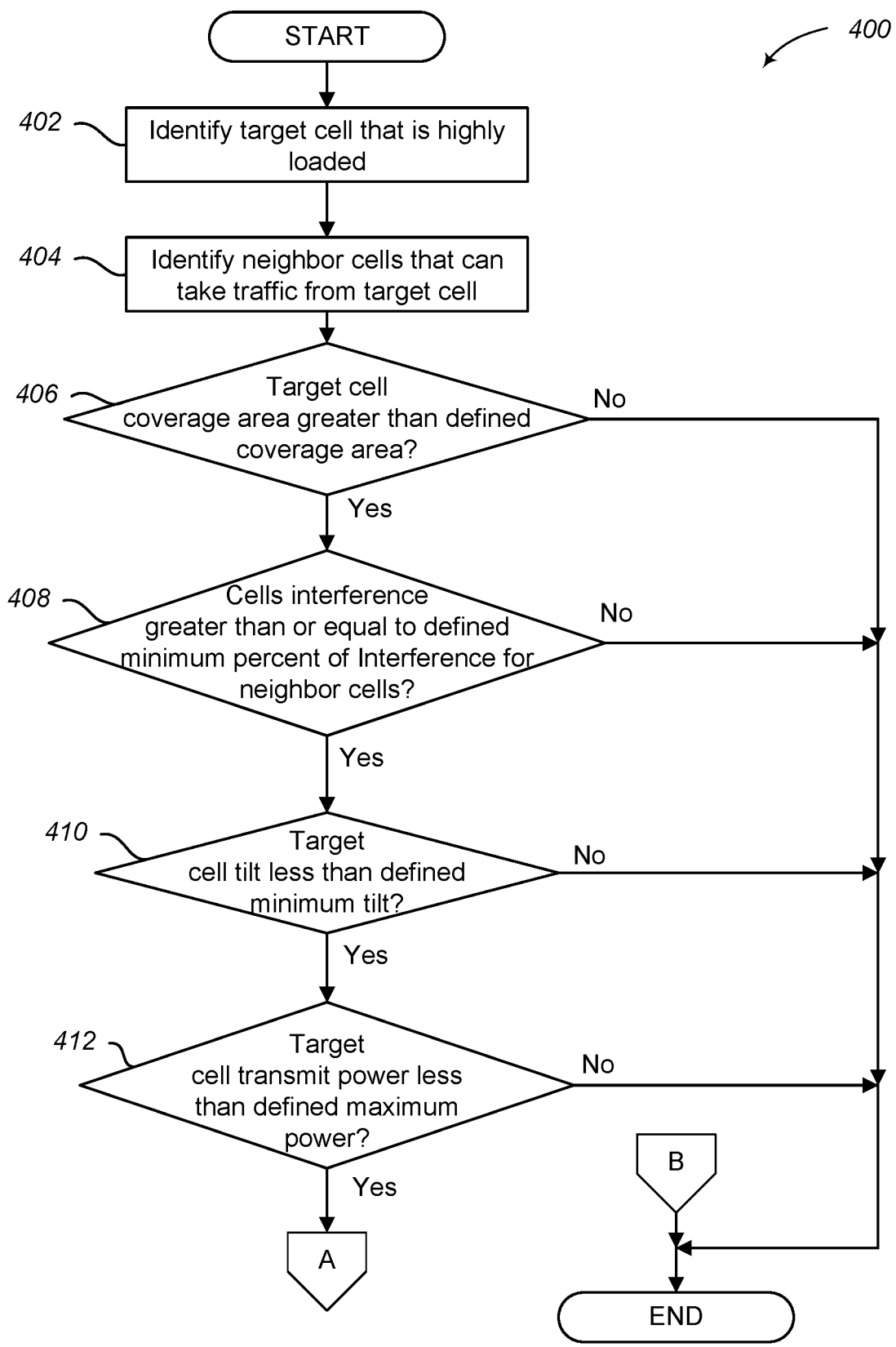
FIGS. 4A-4B illustrate a logical flow diagram showing one embodiment of a process for employing traffic management associated with a highly loaded cell in accordance with embodiments described herein.
Figure 4B:
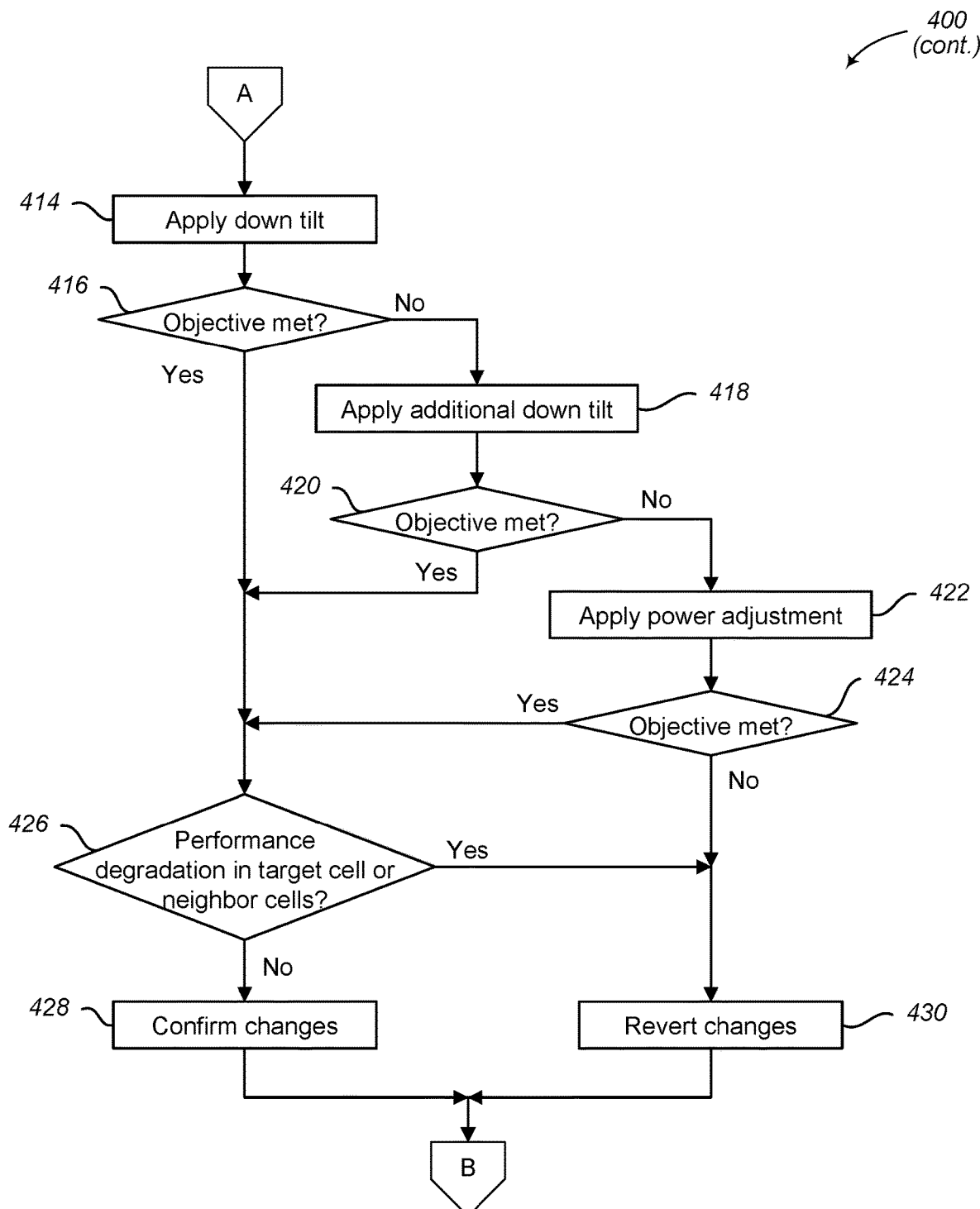

FIGS. 4A-4B illustrate a logical flow diagram showing one embodiment of a process 400 for employing traffic management associated with a highly loaded cell in accordance with embodiments described herein. Process 400 may be an embodiment of network objective 602 in FIG. 6.

Process 400 begins, after a start block, at block 402 in FIG. 4A. At block 402, a target cell that is highly loaded is identified.

Process 400 proceeds to block 404, where one or more neighbor cells that can take traffic from the target cell are identified. In various embodiments, block 404 may employ embodiments of block 304 in FIG. 3 to identify neighbor cells.

Process 400 continues at decision block 406, where a determination is made whether the target cell coverage area is greater than a defined coverage area. In some embodiments, the defined coverage area may be determined based on a physical location or distance of the target cell relative to the neighbor cells or it may be based on the capabilities of the target cell or neighbor cells, or some combination thereof.

In some embodiments, the cell coverage area of the neighbor cells may also be determined.

If the target cell coverage area is greater than a defined coverage area, then process 400 flows to decision block 408; otherwise, process 400 terminates or otherwise returns to a calling process to perform other actions.

At decision block 408, a determination is made whether the target cell interference is greater than or equal to a defined minimum percent of interference from the neighbor cells. In at least one embodiment, an interference matrix, as described above, may be used to determine the interference for the neighbor cells on the target cell. If the interference is greater than or equal to a defined minimum interference percent, then process 400 flows to decision block 410; otherwise, process 400 terminates or otherwise returns to a calling process to perform other actions.

At decision block 410, a determination is made whether the target cell's current tilt is less than a defined minimum tilt. In some embodiments, the target cell or a database may be queried for the current tilt of the target cell. In various embodiments, the current tilt of the neighbor cells may also be determined. If the current tilt of the target cell is less than the defined minimum tilt, then the target cell can be down tilted and process 400 flows to decision block 412; otherwise, process 400 terminates or otherwise returns to a calling process to perform other actions.

At decision block 412, a determination is made whether transmit power for the target cell is less than a defined maximum power. In some embodiments, the target cell or a database may be queried for the current transmit power of the target cell. In various embodiments, the current transmit power of the neighbor cells may also be determined. If the current transmit power of the target cell is less than the defined maximum power, then the transmit power of the target cell can be increased and process 400 flows to block 414 in FIG. 4B; otherwise, process 400 terminates or otherwise returns to a calling process to perform other actions.

At block 414 in FIG. 4B, a down tilt is applied to the target cell. In some embodiments, the down tilt may be a set amount, such as 2 degrees. In other embodiments, the amount of down tilt may be selected and applied based on the load of the target cell. For example, if the highly loaded target cell has a load above a first threshold and below a second threshold, then a first down tilt amount may be selected. But if the load is above the second threshold, then a second down tilt amount may be selected, where the second down tilt amount is greater than the first down tilt amount. In various embodiments, a message is sent to the target cell instructing the target cell to apply the selected down tilt.

Process 400 proceeds next to decision block 416, where a determination is made whether the objective for the target cell is now met. For example, has the load of the target cell been reduced to be below a threshold amount? If the objective is met, process 400 flows to decision block 426; otherwise, process 400 flows to block 418.

At block 418, additional down tilt is applied. In various embodiments, block 418 may employ embodiments similar to block 414 to select an additional down tilt to apply to the target cell.

Process 400 continues next to decision block 420, where a determination is made whether the objective is now met after the additional down tilt is applied. In various embodiments, decision block 420 may employ embodiments similar to decision block 416. If the objective is met, process 400 flows to decision block 426; otherwise, process 400 flows to block 422.

At block 422, the transmit power of the target cell is adjusted. In various embodiments, the transmit power is reduced in an attempt to reduce the target cell's coverage area, which should reduce the amount of traffic and load on the target cell.

In some embodiments, the transmit power adjustment may be a set amount, such as 2 percent. In other embodiments, the amount of transmit power adjustment may be selected and applied based on the load of the target cell. For example, if the highly loaded target cell has a load above a first threshold and below a second threshold, then a first transmit power adjustment may be selected. But if the load is above the second threshold, then a second transmit power adjustment may be selected, where the second transmit power adjustment is greater than the first transmit power adjustment. In various embodiments, a message is sent to the target cell instructing the target cell to apply the selected transmit power adjustment.

Process 400 proceeds next to decision block 424, where a determination is made whether the objective is now met after the transmit power adjustment is applied. In various embodiments, decision block 424 may employ embodiments similar to decision block 416. If the objective is met, process 400 flows to decision block 426; otherwise, process 400 flows to block 430.

At decision block 426, a determination is made whether there is a performance degradation in the target cell or a neighbor cell. In some embodiments, the performance of the target cell and the neighbor cells is monitored for a set amount of time after the down tilt or power adjustments. In various embodiments, performance degradation occurs if the performance of the target cell or a neighbor cell is reduced by a threshold percent or amount. If there is no performance degradation, then process 400 flows to block 428 to confirm the tilt or power changes; otherwise, process 400 flows to block 430 where the changes are reversed.

At block 428, the tilt or power changes are confirmed. In some embodiments, the changes may be permanent. In other embodiments, the changes may be temporary. For example, if the changes are being applied for a specific time or for a specific season, then as soon as the specific time expires or the specific season changes, then the changes are reverted to the previous tilt and power settings. In one non-limiting example, the target cell may be positioned near a beach and becomes highly loaded in the summer. The above described tilt and power adjustments may be applied during the summer, but are then reverted to the previous settings during the winter. As another non-limiting example, the target cell may be positioned near a school and becomes highly loaded from 3:00 pm to 4:00 pm. The above described tilt and power adjustments may be applied from 3:00 pm to 4:00 pm, but are then reverted to the previous settings during the rest of the day.

After block 428, process 400 terminates or otherwise returns to a calling process to perform other actions (illustrated by the end block in FIG. 4A).

If the changes are reverted at block 430, a message is sent to the target cell instructing the target cell to revert its tilt or transmit power to its previous settings prior to the adjustments being applied. After block 430, process 400 terminates or otherwise returns to a calling process to perform other actions (illustrated by the end block in FIG. 4A).

Figure 5A:
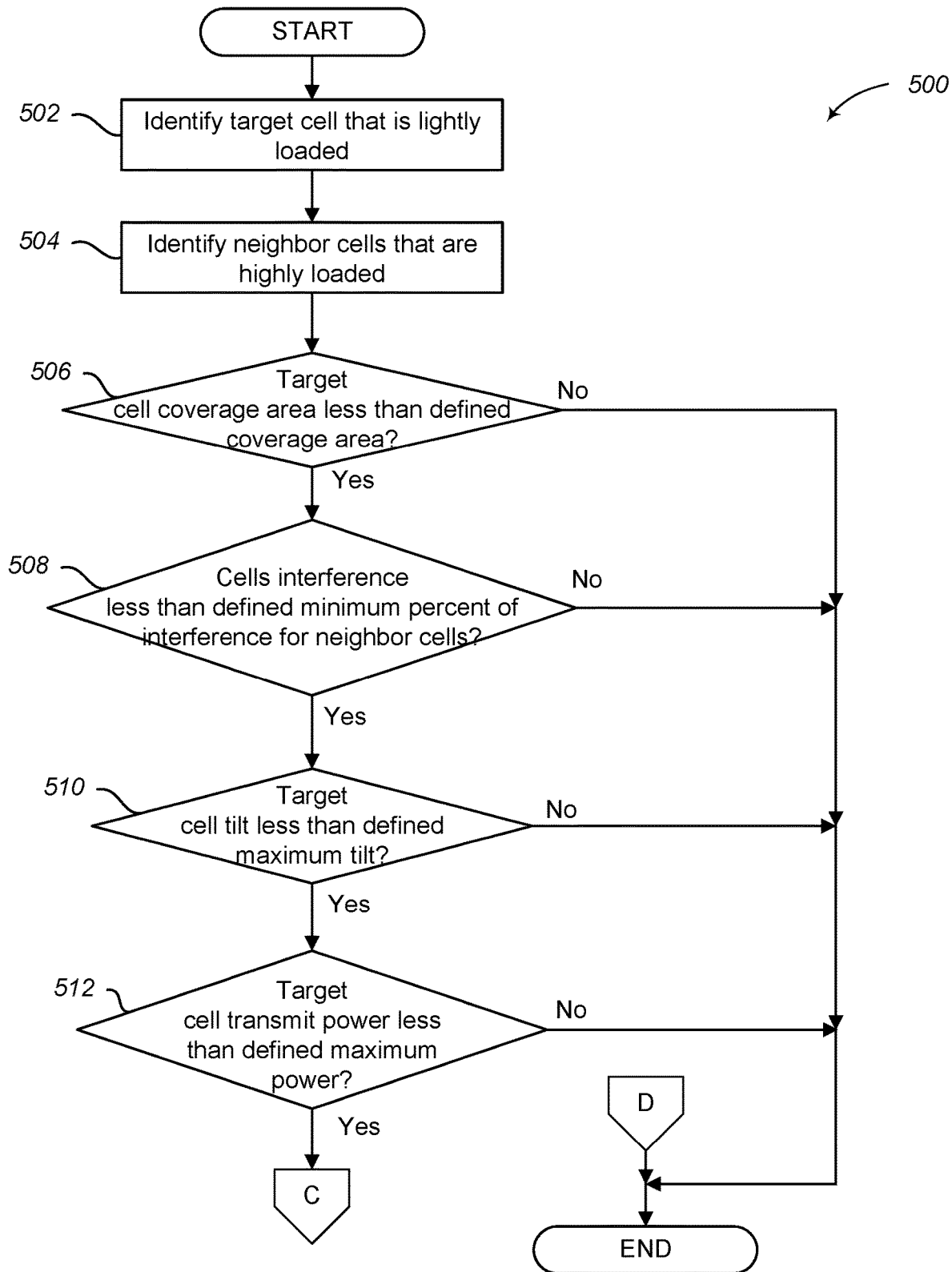
FIGS. 5A-5B illustrate a logical flow diagram showing one embodiment of a process for employing traffic management associated with a lightly loaded cell in accordance with embodiments described herein.
Figure 5B:
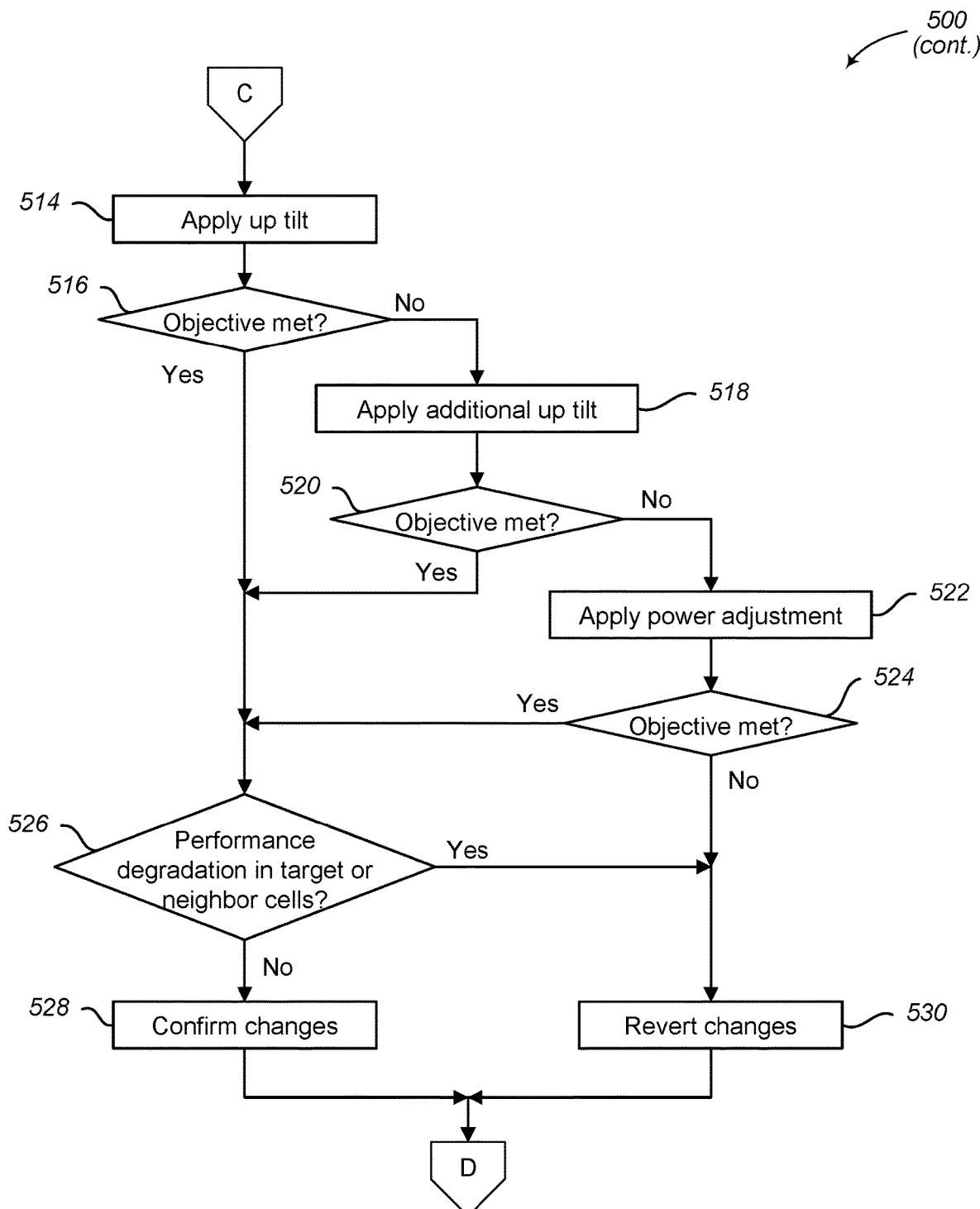

FIGS. 5A-5B illustrate a logical flow diagram showing one embodiment of a process 500 for employing traffic management associated with a lightly loaded cell in accordance with embodiments described herein. Process 500 may be an embodiment of network objective 603 in FIG. 6.

Process 500 begins, after a start block, at block 502 in FIG. 5A. At block 502, a target cell that is lightly loaded is identified.

Process 500 proceeds to block 504, where one or more neighbor cells that can take traffic from the target cell are identified. In various embodiments, block 504 may employ embodiments of block 304 in FIG. 3 to identify neighbor cells.

Process 500 continues at decision block 506, where a determination is made whether the target cell coverage area is less than a defined coverage area. In some embodiments, the defined coverage area may be determined based on a physical location or distance of the target cell relative to the neighbor cells or it may be based on the capabilities of the target cell or neighbor cells, or some combination thereof.

In some embodiments, the cell coverage area of the neighbor cells may also be determined.

If the target cell coverage area is less than a defined coverage area, then process 500 flows to decision block 508; otherwise, process 500 terminates or otherwise returns to a calling process to perform other actions.

At decision block 508, a determination is made whether the target cell interference is less than a defined minimum percent of interference from the neighbor cells. In at least one embodiment, an interference matrix, as described above, may be used to determine the interference for the neighbor cells on the target cell. If the interference is less than the defined minimum interference percent, then process 500 flows to decision block 510; otherwise, process 500 terminates or otherwise returns to a calling process to perform other actions.

At decision block 510, a determination is made whether the target cell's current tilt is less than a defined maximum tilt. In some embodiments, the target cell or a database may be queried for the current tilt of the target cell. In various embodiments, the current tilt of the neighbor cells may also be determined. If the current tilt of the target cell is less than the defined maximum tilt, then the target cell can be down tilted and process 500 flows to decision block 512; otherwise, process 500 terminates or otherwise returns to a calling process to perform other actions.

At decision block 512, a determination is made whether transmit power for the target cell is less than a defined maximum power. In some embodiments, the target cell or a database may be queried for the current transmit power of the target cell. In various embodiments, the current transmit power of the neighbor cells may also be determined. If the current transmit power of the target cell is less than the defined maximum power, then the transmit power of the target cell can be increased and process 500 flows to block 514 in FIG. 5B; otherwise, process 500 terminates or otherwise returns to a calling process to perform other actions.

At block 514 in FIG. 5B, an up tilt is applied to the target cell. In some embodiments, the up tilt may be a set amount, such as 2 degrees. In other embodiments, the amount of up tilt may be selected and applied based on the load of the target cell. For example, if the lightly loaded target cell has a load below a first threshold and above a second threshold, then a first up tilt amount may be selected. But if the load is below the second threshold, then a second up tilt amount may be selected, where the second up tilt amount is greater than the first up tilt amount. In various embodiments, a message is sent to the target cell instructing the target cell to apply the selected up tilt.

Process 500 proceeds next to decision block 516, where a determination is made whether the objective for the target cell is now met. In various embodiments, decision block 516 may employ embodiments similar to decision block 416 in FIG. 4A. If the objective is met, process 500 flows to decision block 526; otherwise, process 500 flows to block 518.

At block 518, additional up tilt is applied. In various embodiments, block 518 may employ embodiments similar to block 514 to select an additional up tilt to apply to the target cell.

Process 500 continues next to decision block 520, where a determination is made whether the objective is now met after the additional up tilt is applied. In various embodiments, decision block 520 may employ embodiments similar to decision block 516. If the objective is met, process 500 flows to decision block 526; otherwise, process 500 flows to block 522.

At block 522, the transmit power of the target cell is adjusted. In various embodiments, the transmit power is increased in an attempt to increase the target cell's coverage area, which should increase the amount of traffic and load on the target cell.

In some embodiments, the transmit power adjustment may be a set amount, such as 2 percent. In other embodiments, the amount of transmit power adjustment may be selected and applied based on the load of the target cell. For example, if the lightly loaded target cell has a load below a first threshold and above a second threshold, then a first transmit power adjustment may be selected. But if the load is below the second threshold, then a second transmit power adjustment may be selected, where the second transmit power adjustment is greater than the first transmit power adjustment. In various embodiments, a message is sent to the target cell instructing the target cell to apply the selected transmit power adjustment.

Process 500 proceeds next to decision block 524, where a determination is made whether the objective is now met after the transmit power adjustment is applied. In various embodiments, decision block 524 may employ embodiments similar to decision block 516. If the objective is met, process 500 flows to decision block 526; otherwise, process 500 flows to block 530.

At decision block 526, a determination is made whether there is a performance degradation in the target cell or a neighbor cell. In various embodiments, decision block 526 may employ embodiments similar to decision block 426 in FIG. 4B. If there is no performance degradation, then process 500 flows to block 528 to confirm the tilt or power changes; otherwise, process 500 flows to block 530 where the changes are reversed.

At block 528, the tilt or power changes are confirmed. In various embodiments, block 528 may employ embodiments similar to block 428 in FIG. 4B.

After block 528, process 500 terminates or otherwise returns to a calling process to perform other actions (illustrated by the end block in FIG. 5A).

If the changes are reverted at block 530, a message is sent to the target cell instructing the target cell to revert its tilt or transmit power to its previous settings prior to the adjustments being applied. After block 530, process 500 terminates or otherwise returns to a calling process to perform other actions (illustrated by the end block in FIG. 5A).

FIGS. 6A-6B illustrate a table 600 of example use case scenarios for implementing zero touch traffic management in accordance with embodiments described herein. Table 600 includes network objectives 602-617 for a target cell. The following is a brief discussion of each network objective and the possible actions taken by the target cell or a neighbor cell. Embodiments described herein can be employed to determine the target cell's and the neighbor cells' current tilt, transmit power, interference, and capabilities.

Network objective 602 is to reduce a load on a highly loaded target cell. To reduce the load on the target cell, the target cell antenna can be down tilted, the target cell can reduce its transmit power, one or more neighbor cells can increase their transmit power, or some combination thereof.

Network objective 603 is to increase load on lightly loaded target cell. To increase the load on the target cell, the target cell antenna can be up tilted, the target cell can increase its transmit power, or some combination thereof.

Network objective 604 is to improve target cell utilization based on users movements. When users move into an area, the target cell can increase its coverage area to assist in handling the increased traffic and the target cell antenna can be up tilted, the target cell can increase its transmit power, or some combination thereof.

Network objective 605 is to improve target cell uplink network quality. The uplink quality may be improved by having the target cell antenna down tilt, the target cell can reduce its transmit power, one or more neighbor cells can increase their transmit power, or some combination thereof.

Network objective 606 is to improve interference to target loaded cells. To reduce the interference and to reduce the load on the target cell, the target cell antenna can be down tilted, the target cell can reduce its transmit power, or some combination thereof.

Network objective 607 is to improve target cell utilization if priority requirement. If users are to receive priority, then the target cell can increase its coverage area to assist in handling the higher priority users and the target cell antenna can be up tilted, the target cell can increase its transmit power, or some combination thereof. The transmit power of neighboring cells can be reduced to reduce the interference on the target cell, which can help improve the target cell's ability to handle the priority requirements of the users.

Network objective 608 is where the target cell does not handle high priority requirements. To handle power priority requirements, the target cell antenna can be down tilted, the target cell can reduce its transmit power, or some combination thereof.

Network objective 609 is to adjust target cell utilization based on new turned-up cells. When a new cell is brought into the network or is turned-up, then there is potentially less coverage area for the target cell to handle and the target cell target cell antenna can be down tilted, the target cell can reduce its transmit power, or some combination thereof.

Network objective 610 is to improve highly loaded target cell to maintain service quality. Because the target cell is loaded and it is to maintain a determined level of service quality, then the coverage area of the target cell should be reduced. To reduce the coverage area of the target cell, the target cell antenna can be down tilted, the target cell can reduce its transmit power, or some combination thereof.

Network objective 611 is to improve target cell utilization based on time of user movements. Depending on the users movements, the target cell can be down tilted or up tilted, reduce or increase its transmit power, or have neighboring cells increase or reduce their transmit power, or some combination thereof. If the users move into an area of the target cell, then the target cell can be down tilted or reduce its transmit power so that it does not become overloaded by the increase in users. Likewise, the transmit power of neighboring cells can be increased to help with the extra user traffic. Conversely, if the users move out of the area of the target cell, then the target cell can be up tilted or increase its transmit power so that it is not too lightly loaded by the decrease in users. Likewise, the transmit power of neighboring cells can be decreased to not interfere with the changes to the target cell.

Network objective 612 is to improve target cell utilization based on seasonal users movements. Similar to user movements, different seasons can see an increase in the amount of traffic the target cell handles or a decrease in the amount traffic the target cell handles. Accordingly, depending on the season, the target cell can be down tilted or up tilted, reduce or increase its transmit power, or have neighboring cells increase or reduce their transmit power, or some combination thereof to account for different traffic amounts during different seasons.

Network objective 613 is to improve target cell utilization based on users speed and requirements. If the target cell is near a highway during low vehicle volumes and high vehicle speeds, then the target cell may up tilt or increase its transmit power to increase its coverage area, which should reduce the number of hand offs between towers. Conversely, if the target cell is near a highway during rush hour with high vehicle volumes and low vehicle speeds, then the target cell may down tilt or decrease its transmit power to reduce its coverage area, which should reduce the potential of the target cell becoming overloaded.

Network objective 614 is to improve target cell utilization based on interference user experience. If there is too much interference between cells, then there may be too much overlap in their coverage areas. To reduce the overlapping coverage areas, the target cell target cell antenna can be down tilted, the target cell can reduce its transmit power, neighboring cells can reduce their transmit power, or some combination thereof.

Network objective 615 is to improve target cell utilization based on low coverage user experience. If users provide feedback that there is an area that does not have sufficient coverage, then there may be gaps between cell coverage areas. To reduce the gaps, the target cell target cell antenna can be up tilted, the target cell can increase its transmit power, neighboring cells can increase their transmit power, or some combination thereof.

Network objective 616 is to improve target cell utilization based on neighbor cell service interruption. These interruptions may be the result of low coverage areas, such as if there are trees or structures that obscure the coverage area. To reduce service interruptions, the target cell antenna can be up tilted, the target cell can increase its transmit power, or some combination thereof.

These example use cases are not to be considered as limiting, but rather illustrative of how a tilt and transmit power adjustments can be used to meet a network objective.

Figure 7:
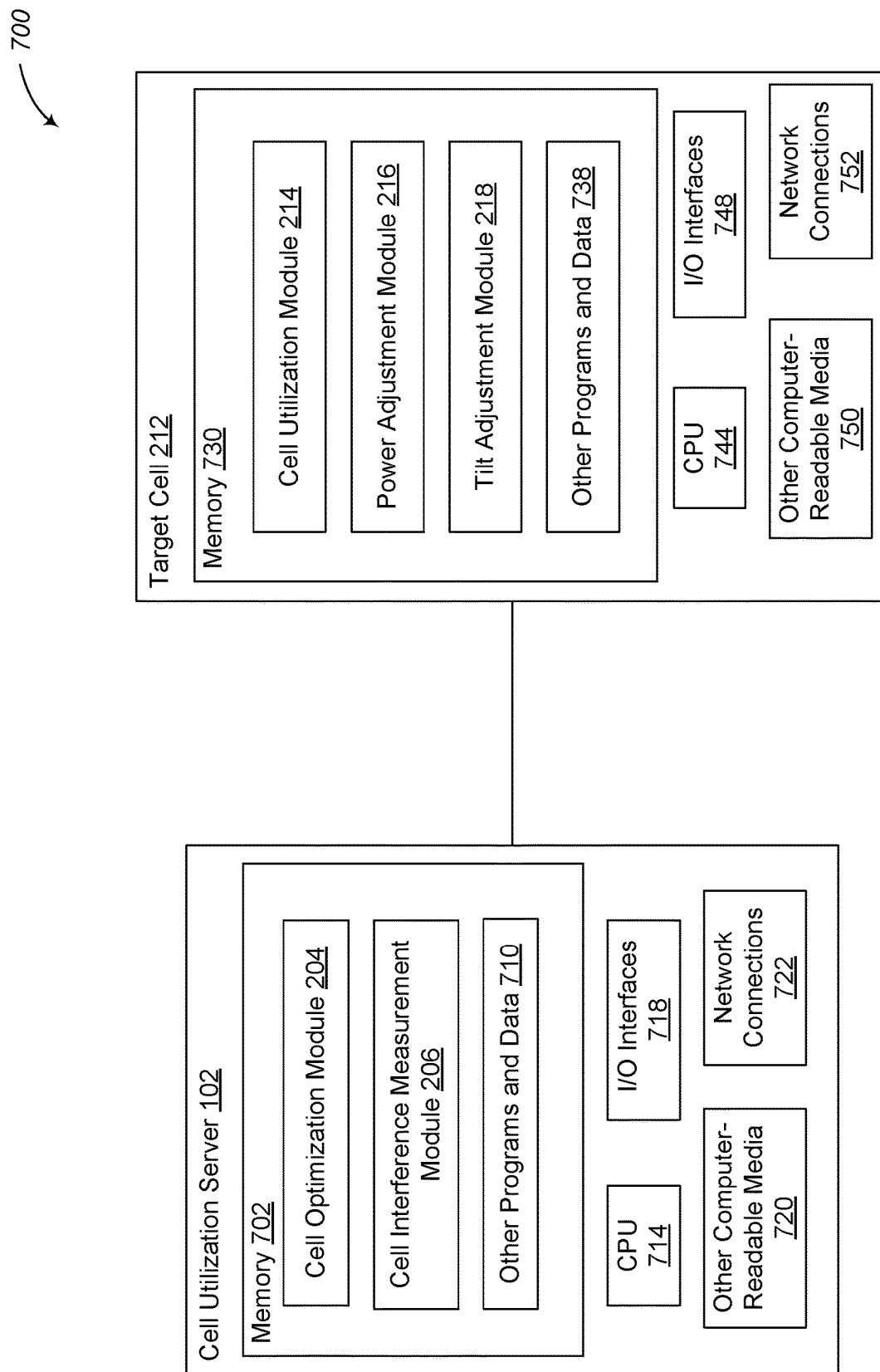
FIG. 7 shows a system diagram that describe various implementations of computing systems for implementing embodiments described herein.

FIG. 7 shows a system diagram that describe various implementations of computing systems for implementing embodiments described herein. System 700 includes a cell-utilization server 102 and a target cell 212.

Cell utilization server 102 determines if the target cell 212 should adjust its antenna tilt or transmit power to meet a network objective. One or more special-purpose computing systems may be used to implement cell utilization server 102. Accordingly, various embodiments described herein may be implemented in software, hardware, firmware, or in some combination thereof. Cell utilization server 102 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 702 may be utilized to store information, including computer-readable instructions that are utilized by CPU 714 to perform actions, including embodiments described herein.

Memory 702 may have stored thereon cell optimization module 204 and cell interference measurement module 206. The cell optimization module 204 is configured to obtain information regarding a target cell, and optionally one or more neighbor cells, to determine if the target cell should perform an antenna tilt adjustment, a transmit power adjustment, or a combination thereof. In some embodiments, the cell optimization module 204 may perform embodiments described herein for a plurality of separate target cells 112. The cell interference measurement module 206 is configured to calculate the interference between cells (e.g., a target cell and other neighboring cells) based on their locations, current transmit power, current antenna tilt, obstructions between cells, or other variables that can impact the interference between cells. Memory 702 may also store other programs and data 710, which may include cell capabilities, current tilt or transmit power settings of cells, etc.

Network connections 722 are configured to communicate with other computing devices to facilitate the tilt or transmit power adjustments described herein. In various embodiments, the network connections 722 include transmitters and receivers (not illustrated) to send and receive data as described herein. I/O interfaces 718 may include a video interfaces, other data input or output interfaces, or the like. Other computer-readable media 720 may include other types of stationary or removable computer-readable media, such as removable flash drives, external hard drives, or the like.

Target cell 212 handle cellular network traffic for one or more users. The target cell 212 can adjust its antenna tilt or its transmit power to meet a network objective, as described herein. One or more special-purpose computing systems may be used to implement target cell 212. Accordingly, various embodiments described herein may be implemented in software, hardware, firmware, or in some combination thereof. Target cell 212 may include memory 730, one or more central processing units (CPUs) 744, I/O interfaces 748, other computer-readable media 750, and network connections 752.

Memory 730 may include one or more various types of non-volatile and/or volatile storage technologies similar to memory 702. Memory 730 may be utilized to store information, including computer-readable instructions that are utilized by CPU 744 to perform actions, including embodiments described herein. Memory 730 may have stored thereon cell utilization module 214, power adjustment module 216, and tilt adjustment module 218. The cell utilization module 214 receives the messages or instructions from the cell optimization module 204 of the cell utilization server 102 indicating tilt or transmit power adjustments that the target cell 212 is to perform. In some embodiments, the cell utilization module 214 may also perform embodiments of the cell optimization module 204 to determine the tilt or transmit power adjustments. The power adjustment module 216 performs the necessary calculations and device settings to adjust or modify the transmit power of the target cell 212. The tilt adjustment module 218 performs the necessary calculations and device settings to adjust or modify the electrical tilt of the antenna of the target cell 212. Memory 730 may also store other programs and data 738, which may include tilt or transmit power parameters or capabilities of the target cell 212, the current tilt or transmit power settings, etc.

Network connections 752 are configured to communicate with other computing devices, such as cell utilization server 102. In various embodiments, the network connections 752 include transmitters and receivers (not illustrated) to send and receive data as described herein. I/O interfaces 748 may include one or more other data input or output interfaces. Other computer-readable media 750 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
a memory that stores computer instructions; and
a processor that executes the computer instructions to:
   select a second cell in a network that is a neighbor of a first cell in the network having a first traffic load that is higher than a second traffic load of the second cell;
   determine a first effective radio height of the first cell based on a combination of a first terrain elevation at the first cell and a first antenna height of the first cell;
   determine a second effective radio height of the second cell based on a combination of a second terrain elevation at the second cell and a second antenna height of the second cell;
   determine a first transmit power adjustment for the first cell and a second transmit power adjustment for the second cell based on the first traffic load, the second traffic load, the first effective radio height, and the second effective radio height;
   instruct the first cell to employ the first transmit power adjustment; and
   instruct the second cell to employ the second transmit power adjustment.

2. The computing device of claim 1, wherein the processor determines the first transmit power adjustment for the first cell and the second transmit power adjustment for the second cell by further executing the computer instructions to:
   generate an elevation matrix based on a first position of the first cell relative to a second position of the second cell and the first effective radio height of the first cell relative to the second effective radio height of the second cell; and
   employ the elevation matrix to determine the first transmit power adjustment and the second transmit power adjustment.

3. The computing device of claim 1, wherein the processor determines the first transmit power adjustment for the first cell and the second transmit power adjustment for the second cell by further executing the computer instructions to:
   select the first transmit power adjustment for the first cell to be a decrease in transmit power adjustment.

4. The computing device of claim 1, wherein the processor determines the first transmit power adjustment for the first cell and the second transmit power adjustment for the second cell by further executing the computer instructions to:
   select the second transmit power adjustment for the second cell to be an increase in transmit power adjustment.

5. The computing device of claim 1, wherein the processor determines the first transmit power adjustment for the first cell and the second transmit power adjustment for the second cell by further executing the computer instructions to:
   generate an interference matrix based on the first position of the first cell relative to the second position of the second cell; and
   employ the interference matrix to determine the first transmit power adjustment and the second transmit power adjustment.

6. The computing device of claim 1, wherein the processor further executes the computer instructions to:
   determine an antenna tilt adjustment for the first cell based on the first traffic load, the second traffic load, the first effective radio height, and the second effective radio height; and
   instruct the first cell to employ the antenna tilt adjustment.

7. The computing device of claim 1, wherein the processor further executes the computer instructions to:
   determine an antenna tilt adjustment for the second cell based on the first traffic load, the second traffic load, the first effective radio height, and the second effective radio height; and
   instruct the second cell to employ the antenna tilt adjustment.

8. The computing device of claim 1, wherein the processor further executes the computer instructions to:
   generate an interference matrix based on a first position of the first cell relative to a second position of the second cell;
   employ the interference matrix to determine an antenna tilt adjustment for the first cell; and
   instruct the first cell to employ the antenna tilt adjustment.

9. The computing device of claim 1, wherein the processor further executes the computer instructions to:
   generate an interference matrix based on a first position of the first cell relative to a second position of the second cell;
   employ the interference matrix to determine an antenna tilt adjustment for the second cell; and
   instruct the second cell to employ the antenna tilt adjustment.

10. A method, comprising:
identifying a second cell in a network that is a neighbor of a first cell in the network and that has a second traffic load that is lower than a first traffic load of the first cell;
determining a first effective radio height of the first cell based on a first terrain elevation at the first cell and a first antenna height of the first cell;

determining a second effective radio height of the second cell based on a second terrain elevation at the second cell and a second antenna height of the second cell; and instructing the second cell to employ a transmit power adjustment based on at least one of the first traffic load, the second traffic load, the first effective radio height, and the second effective radio height.

11. The method of claim 10, further comprising:

generating an elevation matrix based on a first position of the first cell relative to a second position of the second cell and the first effective radio height of the first cell relative to the second effective radio height of the second cell; and employing the elevation matrix to determine the transmit power adjustment.

12. The method of claim 10, further comprising:

selecting the transmit power adjustment for the second cell to be an increase transmit power adjustment.

13. The method of claim 10, further comprising:

generating an interference matrix based on the first position of the first cell relative to the second position of the second cell; and employing the interference matrix to determine the transmit power adjustment.

14. The method of claim 10, further comprising:

determining an antenna tilt adjustment for the second cell based on the first traffic load, the second traffic load, the first effective radio height, and the second effective radio height; and instructing the second cell to employ the antenna tilt adjustment.

15. The method of claim 10, further comprising:

generating an interference matrix based on a first position of the first cell relative to a second position of the second cell;

employing the interference matrix to determine an antenna tilt adjustment for the second cell; and instructing the second cell to employ the antenna tilt adjustment.

16. A system, comprising:

a first cell in a network, including:
  a first memory that stores first computer instructions; and
  a first processor that executes the first computer instructions to:
    apply a transmit power adjustment; and a cell utilization server, including:
  a second memory that stores second computer instructions; and
  a second processor that executes the second computer instructions to:
    select a second cell in the network that is a neighbor of the first cell and that has a second traffic load that is lower than a first traffic load of the first cell;
    determine a first effective radio height of the first cell based on a combination of a first terrain elevation at the first cell and a first antenna height of the first cell;
    determine a second effective radio height of the second cell based on a combination of a second terrain elevation at the second cell and a second antenna height of the second cell;
    instruct the first cell to employ a transmit power adjustment based on at least one of the first traffic load, the second traffic load, the first effective radio height, and the second effective radio height.

17. The system of claim 16, wherein the second processor determines the transmit power adjustment for the first cell by further executing the second computer instructions to:

generate an elevation matrix based on a first position of the first cell relative to a second position of the second cell and the first effective radio height of the first cell relative to the second effective radio height of the second cell; and employ the elevation matrix to determine the transmit power adjustment.

18. The system of claim 16, wherein the second processor determines the transmit power adjustment for the first cell by further executing the second computer instructions to:

select the transmit power adjustment for the first cell to be a decrease transmit power adjustment.

19. The system of claim 16, wherein the second processor further executes the second computer instructions to:

determine an antenna tilt adjustment for the first cell based on the first traffic load, the second traffic load, the first effective radio height, and the second effective radio height; and instruct the first cell to employ the antenna tilt adjustment.

20. The system of claim 16, wherein the second processor further executes the second computer instructions to:

generate an interference matrix based on a first position of the first cell relative to a second position of the second cell;

employ the interference matrix to determine an antenna tilt adjustment for the first cell; and instruct the first cell to employ the antenna adjustment.

* * * * *